United States Patent [19]

Hassan

[11] 3,820,907
[45] June 28, 1974

[54] BALL JOINT
[75] Inventor: Morris Hassan, Trenton, Mich.
[73] Assignee: Chrysler Corporation, Highland Park, Mich.
[22] Filed: June 4, 1973
[21] Appl. No.: 367,066

[52] U.S. Cl. .................................. 403/27, 403/138
[51] Int. Cl. .............................................. F16c 11/06
[58] Field of Search ........... 403/124, 126, 138, 137, 403/144, 27

[56] References Cited
UNITED STATES PATENTS
3,056,617  10/1962  Snoddy .............................. 285/341
3,337,247  8/1967  Moskovitz .......................... 403/138

Primary Examiner—Andrew V. Kundrat
Attorney, Agent, or Firm—Talburtt & Baldwin

[57] ABSTRACT

Ball joint suspension apparatus including an upper control arm and lower control arm connected by ball joints to a steering knuckle. One ball joint assembly includes a stud having a ball on one end mounted in a socket. A pressure plate is backed by a separate washer which is biased by a resilient member. The plate engages the ball and keeps it in contact with the socket as the socket and ball wear. A retainer located in the socket limits the amount of movement of the separate washer.

6 Claims, 7 Drawing Figures

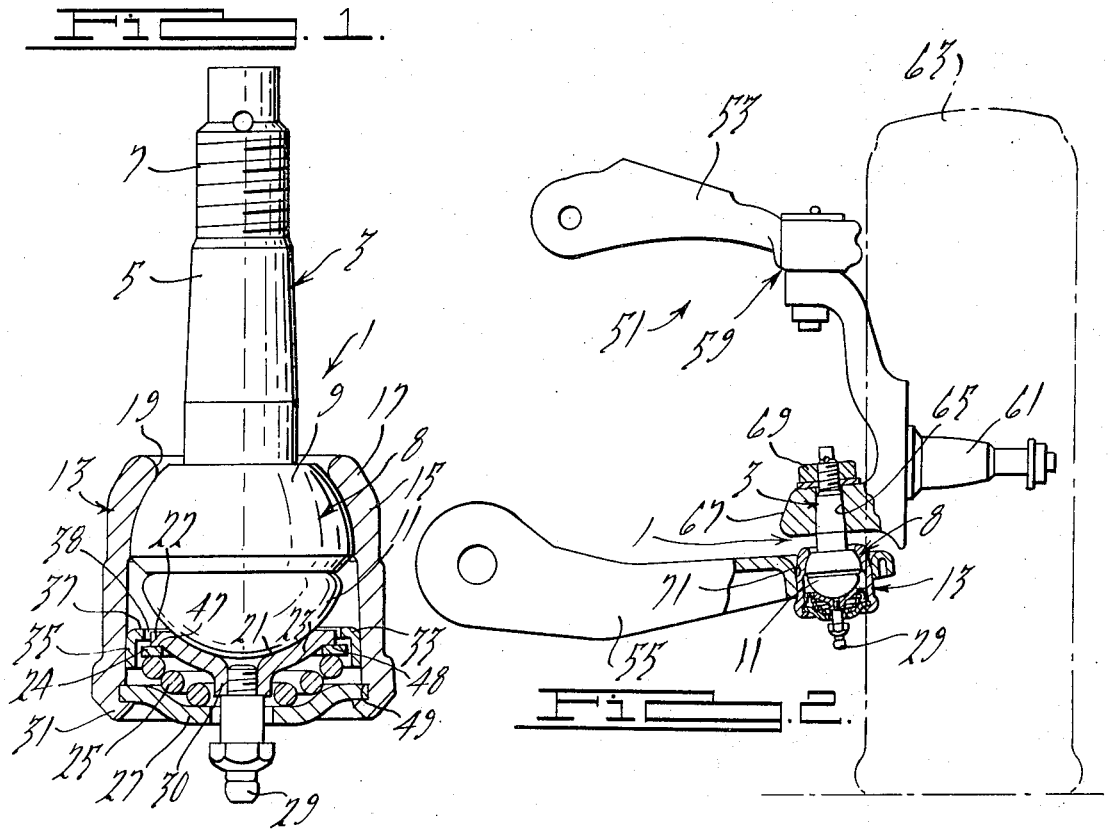
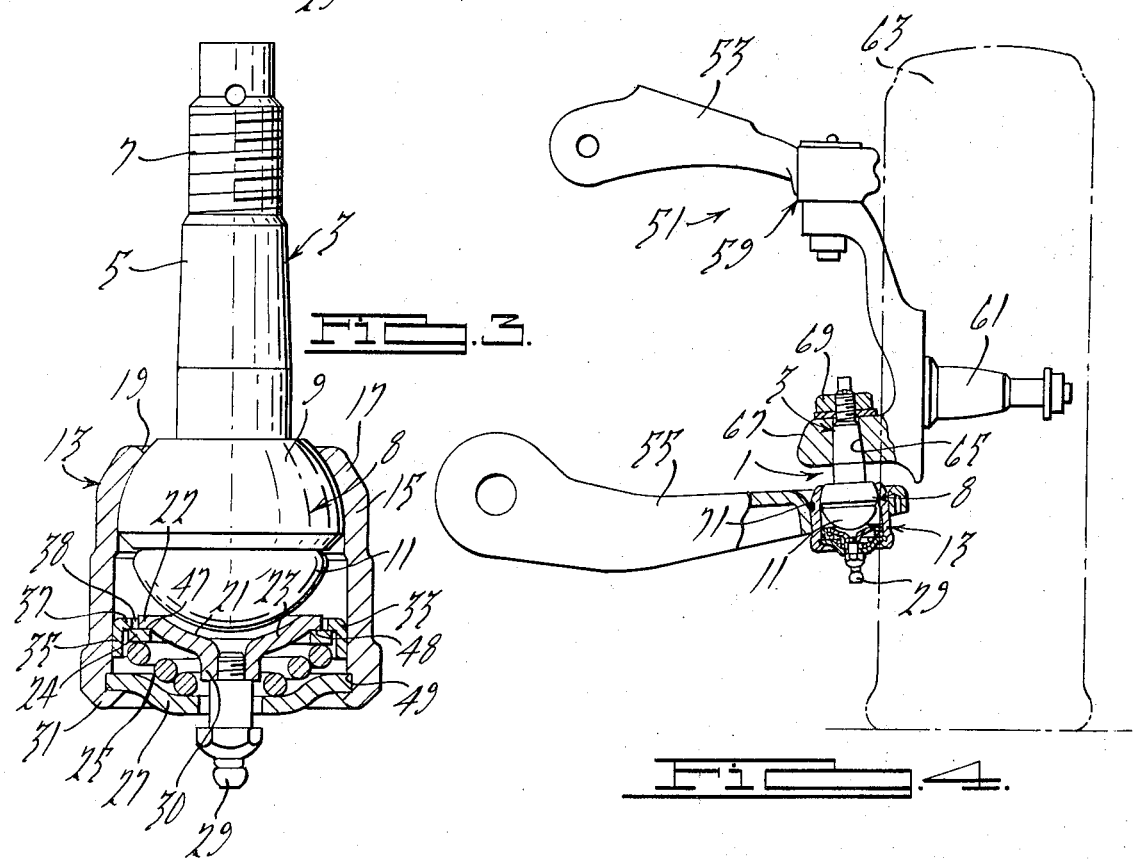

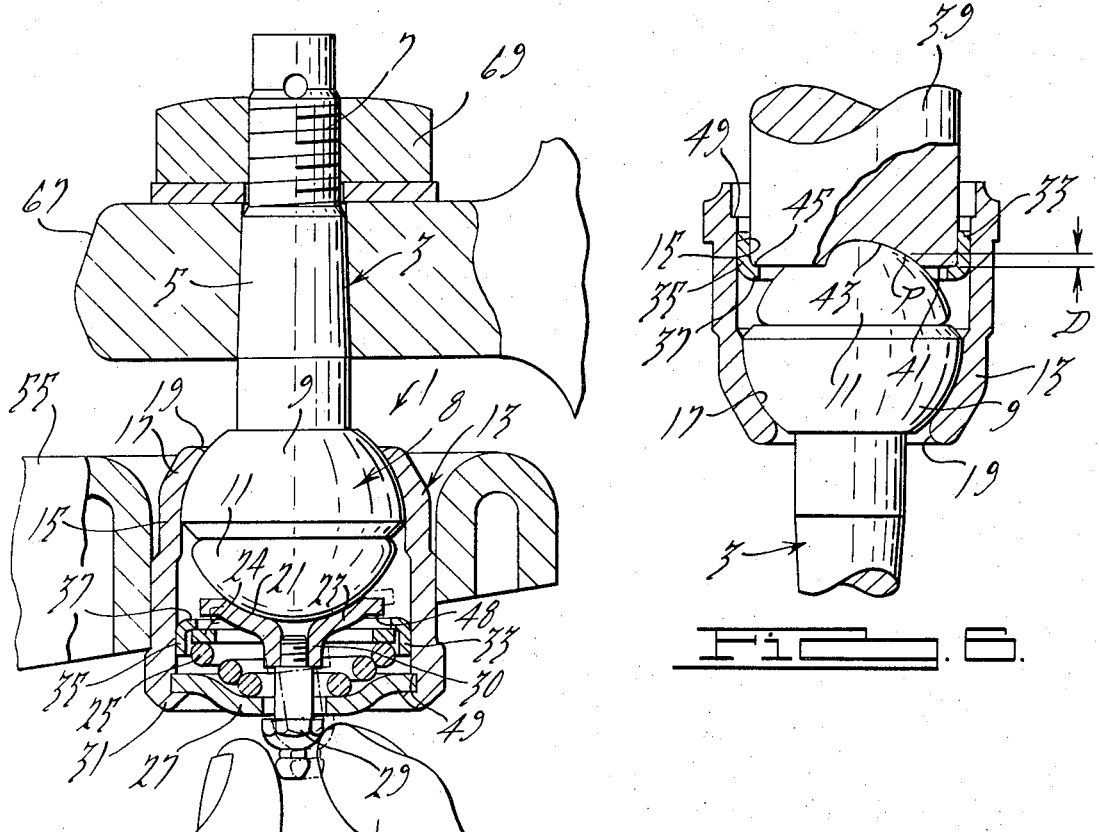
FIG. 5.
FIG. 6.
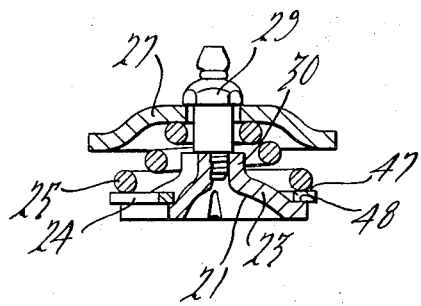
FIG. 7.

3,820,907

BALL JOINT

BACKGROUND OF THE INVENTION

This invention relates to ball joints, and more particularly, to ball joints of the type used in front suspension members of automotive vehicles. This ball joint is an improvement over the structure shown in my copending application Ser. No. 303,728 filed Nov. 6, 1972.

Normally ball joints for automotive suspension systems are provided with one or more springs or other resilient means which provide a preload on the joint. This preload keeps the ball portion of the joint in contact with the socket as the ball wears, thereby preventing the joint from having a loose fit or developing "play." In many suspension applications, even though a certain amount of wear on the housing or socket has taken place, the joint is still very functional since the ball shank is under tension when the wheel is on the road and the ball is held against the socket. However, when an inspection of the suspension components is undertaken the vehicle is normally placed on a hoist in such a manner that the wheels are suspended from the vehicle, rather than the vehicle being suspended from the wheels. The wheel can be wobbled or shaken and the "play" of the ball joint will be noticeable.

In the past, some mechanics and garage operators would demonstrate the aforenoted play in the ball joints, and might convince customers that all joints which have play needed replacement. However, as noted above, even when jacked up, ball joints which are in excellent condition may have some play. It is only when the weight of the car is resting on them that they should not have any play.

Some ball joints have been spring loaded to eliminate the play therein even when the vehicle was placed on a hoist. However, since ball joints do wear, this made it difficult to tell when replacement was really necessary.

In my aforenoted copending application I show a ball joint which remained relatively tight until the housing and/or ball thereof have undergone sufficient wear that the joint should be replaced, at which time, if the vehicle or wheel were placed on a hoist, the joint would exhibit a noticeable degree of looseness or play. Thus, this signals the need for replacement of the joint. The present invention is generally similar to the type shown in the aforenoted copending application, but overcomes one of the difficulties encountered in checking the wear on the joint.

BRIEF SUMMARY OF THE INVENTION

Briefly, this invention comprises a preloaded ball joint similar in many respects to the joint shown in the aforenoted application, but including improved means for providing a positive indication when a predetermined amount of wear has taken place.

One of the primary objects of this invention is to provide a ball joint the condition of which may be simply and accurately determined without the necessity of special equipment or trained personnel and without the necessity of hoisting the wheel.

Another object of this invention is to provide a ball joint which remains relatively tight until the housing and/or ball thereof have undergone sufficient wear that the joint should be replaced, in which case a portion of the joint will exhibit a noticeable degree of looseness or play.

A further object of this invention is to provide a ball joint such as described which, without requiring the wheel to be hoisted, will give a noticeable indication of when the ball joint should be replaced regardless of the normal accumulative variations or stack up of variations which occur when assembling several parts together.

Another object of this invention is to provide a ball joint which eliminates the guesswork or interpretation presently required in determining whether or not a ball joint is still functional or whether it would be advisable to replace the same.

A further object of this invention is to provide a ball joint of the type described which is economical in construction and effective in operation.

Other objects and advantages will be made apparent as the description progresses.

BRIEF DESCRIPTION OF THE DRAWINGS

In the accompanying drawings, in which one of various possible embodiments are shown, FIG. 1 is a vertical sectional view through a tension type ball joint showing the arrangement and relationship of the parts thereof when the ball joint is first assembled;

FIG. 2 is an elevational view of a wheel and suspension components therefor, showing a ball joint of this invention which is still functional, shown in section;

FIG. 3 is a sectional view of a ball joint after the latter is worn to a point wherein replacement is advisable;

FIG. 4 is a view similar to FIG. 2 only showing the ball joint of FIG. 3 in a suspension system in a loaded condition;

FIG. 5 is a fragmentary enlarged view of FIG. 4 showing the method of testing the tightness of the joint;

FIG. 6 is an enlarged fragmentary view showing one step in the method of setting a retainer used in this invention; and FIG. 7 is side elevation of an assembly used in the invention, parts being shown in section.

Like parts are shown by corresponding reference characters throughout the several views of the drawings.

DESCRIPTION OF THE PREFERRED EMBODIMENT

Referring now to the drawings, a ball joint of this invention is generally indicated at 1 in FIG. 1. It includes a stud 3 having a shank 5 threaded at one end 7 and a ball portion 8 having a first generally hemispherical portion 9 adjacent shank 5 and a second generally hemispherical portion 11 extending away from portion 9.

The stud 3, and more particularly the ball portion 8, is located within a socket or housing 13. The housing 13 has a cylindrical portion 15 merging into a socket or curved portion 17 which mates with hemispherical portion 9. Socket portion 17 has an opening 19 therein through which shank 5 and the adjacent portion of hemispherical portion 9 extend.

The hemispherical portion 11 is seated on a dished portion 21 of a pressure plate 23. A peripheral flange 22 is backed by a washer or pusher ring 24 which is biased toward the flange 22 by a preload resilient and compressed spring 25. As shown, the preload means is a conventional coil spring, but it will be understood that certain other types of resilient springs such as a Belleville spring, for example, would also function. A cap 27 closes the housing 13 and backs up the spring 25. The cap or closure plate 27 has an opening through which a lubrication fitting 29 loosely passes. The fitting 29 is threaded at its inner end into a tubular threaded sleeve 30 in the plate 23. The plate 27 is held in place by a crimp 31 spun from the end of the housing 13.

A preload limiter or washer retainer 33 is pressed into the cylindrical portion 15. It includes an annular ring portion 35 and a radially inwardly extending flange 37. The diameter of plate 23 is such that the plate can pass freely through the retainer 33, i.e., the outside diameter of flange 22 is smaller than the inside diameter of the flange 37 leaving an annular space 38. However, the washer 24 spans the space 38 and overlaps both flange 22 and flange 37. As shown in FIG. 1, the flange 37 is spaced from the washer 24 by a certain distance. As will be made apparent, this certain distance is predetermined when the ball joint is assembled.

The method of positioning the retainer 33 is shown in FIG. 6. During the assembly of the joint the stud 3 is inserted through the opening 19 in the socket 13 until spherical portion 9 seats in the socket portion 17. The retainer 33 is then inserted into the cylindrical portion 15. A positioning arbor 39 has a first annular ring portion 41 having a diameter slightly smaller than the internal diameter of cylindrical portion 35. Spaced inwardly from the ring 41 is an annular spherical segment 43 adapted to mate with a portion of the hemispherical portion 11 of the stud 3. Some point P on the spherical segment 43 is a predetermined distance, in an axial direction, from the surface 45 of flange 37, this predetermined distance being identified by D in FIG. 6 and being the desired distance which the face 47 of washer 24 and face 48 of flange 22 should originally be from surface 45. In other words, the distance D represents the amount of wear which is permissible before replacement of the joint is recommended. This distance should be such that there is considerably more life left in the joint when the joint has worn this amount.

The arbor 39 is moved toward hemispherical portion 11. The ring 41 engages the flange 37 and forces the retainer 33 inwardly with the cylindrical portion 35 having a press fit with portion 15 of housing 13. If desired, the retainer may be secured, as by welding, at its predetermined position. When the spherical segment 43 engages the portion 11 and the portion 9 is seated in the socket section 17, the point P lies in a plane which is the distance D away from the parallel plate in which surface 45 lies. The arbor 39 is then withdrawn and an assembly comprising plate 23, washer 24, spring 25, cover 27 and fitting 29, which holds the assembly together, is placed in position. Pressure is applied to the cap to compress spring 25 until the cap is seated on shoulder 49 of the housing 13. The housing is then spin crimped to hold the cap 27 in place. The compression of spring 25 is sufficient to cause the washer 24 to move into engagement with the flange 37 if unopposed by the stud 3, i.e., the difference between free uncompressed height of the spring and the compressed height thereof is greater than the distance D. In addition, the spring 25 must have sufficient biasing capacity to support the wheel and its supporting assemblies, i.e., to keep the spherical portion 9 seated in socket 17 when the lower control arm is lifted by a hoist.

When the joint is assembled it has the appearance shown in FIG. 1. The ball joint of FIG. 1 is shown in a suspension assembly 51 in FIG. 2. The assembly 51 includes an upper control arm 53 and a lower control arm 55 connected to a steering knuckle 57 by a ball joint 59 and the ball joint 1, respectively. The knuckle 57 has a spindle 61 on which a wheel 63 is mounted in a conventional manner.

A shank 5 extends upwardly through a tapered hole 65 in a boss 67 on knuckle 57. A nut 69 is secured to the threaded end 7 of shank 5 for connecting the ball joint to the knuckle. The housing 13 extends through an opening 71 in the lower control arm 53 and is secured to the latter in a conventional manner.

As shown in FIG. 1, the hemispherical portion 9 is seated in socket portion 17 and the pressure plate 23 is in engagement with the hemispherical portion 11. Thus, the pressure applied to the plate 21 by the portion 11 and spring 25 through washer 24 prevent any substantial movement of the plate and fitting 29 secured thereto. The shank 5 is in tension. If a jack or hoist 73 is used to lift the vehicle such as by lifting the lower control arm 53, the wheel 63 then becomes supported by the control arms. The shank 5 of ball joint 1 is placed in compression. When the ball joint is new the spring 25 keeps the portion 9 seated in socket 17 and the joint will remain tight, even when a mechanic shakes or tries to wobble the wheel.

As the socket 17 and the hemispherical portion 9 wear during use the stud 3 moves upwardly relative to the housing 13. As it gradually moves upwardly the spring 25 expands from its original compressed condition and keeps the portion 9 in engagement with socket 17, thus maintaining the effectiveness of the joint.

As long as washer 24 is not in contact with the flange 37 of the retainer 33, the joint will be tight and the fitting 29 relatively rigid, if a mechanic should attempt to wiggle the fitting 29. However, if the wear on the hemispherical or socket portion has exceeded a predetermined amount, the washer 24 will be prevented, by its engagement with flange 37, from biasing the pressure plate 23 and hence the portion 8 into engagement with socket 17 when the wheel is on the ground. Accordingly, the fitting 29 may be grasped, and since plate 23 is not biased upwardly against the portion 11, may be wriggled and exhibit a looseness which is readily detected. Although the joint may still be capable of performing satisfactorily for many more miles, this positive signal of being loose indicates the advisability of replacing this ball joint.

It will be seen that guesswork is eliminated from making a judgment as to a determination of the amount of wear on the ball joints. If the fitting 29 is tight when an attempt to wriggle it is made and the vehicle is on the ground, the ball joint is still within predetermined wear limits. If the fitting is loose, the joint has exceeded a predetermined amount of wear and should be replaced. Moreover, if the wheel should be placed on a hoist and a mechanic should shake the wheel, the joint will remain tight if it is still within its wear limits. If the wheel is loose, the ball joint has exceeded a predetermined amount of wear and should be replaced. Thus, the tightness of the ball joint can be readily checked when the vehicle wheel is on the ground or when it is hoisted.

Moreover, during the assembly operation many slight variations in dimensions, such as differences in the diameters of the ball portions, are overcome and obviated because the arbor 39 locates the face or surface 45 with respect to the face 47, thus determining the amount of permissible wear. Slight differences in the resiliency of the spring 25 have no effect on the operation of the joint as long as the springs are still under sufficient compression even when washer engages flange 37.

It will be seen that the ball joint of this invention is advantageous over the joint shown in my copending application in that this joint may be checked without raising the wheel.

In view of the foregoing it will be seen that the several other objects of this invention are achieved.

Although only one embodiment of the invention has been disclosed and described, it is apparent that other embodiments and modifications of the invention are possible.

I claim:

1. A ball joint comprising a housing having a socket portion, an opening for said socket portion, a stud having a shank and a first spherical portion adjacent said shank and in said socket portion, said stud extending out of said socket through said opening, said stud having a second spherical portion adjacent said first spherical portion and within said housing, a plate engaging said second spherical portion, a pusher element engaging said plate on the side thereof opposite from the side engaging said second spherical portion, resilient means biasing said pusher element toward said second spherical portion and toward said opening, said pusher element forcing said plate toward said second spherical portion, said plate being adapted to move toward said opening as said first spherical portion and said socket wear, and retaining means in said socket portion extending into the path of said movement of said pusher element to limit the amount of its movement toward said opening, while allowing said plate to move past said retaining means and thus exhibit looseness if the wear on the first spherical portion and said socket exceeds a predetermined amount.

2. A ball joint as set forth in claim 1 further including a cover, a lubrication fitting extending through an opening in said cover and secured at one end to said plate, said fitting, cover, resilient means, pusher member and plate being held together by said fitting and forming a subassembly.

3. A ball joint as set forth in claim 1 wherein said retaining means comprises a ring member, said ring member including a first generally cylindrical portion and a second generally radially extending portion, said generally radially extending portion forming an opening which is larger than the external dimension of said pressure plate, said pusher element having an external dimension which is larger than the internal dimension of said generally radially extending portion and an internal dimension which is smaller than the external dimension of said pressure plate.

4. A ball joint as set forth in claim 3 further including a cover, a lubrication fitting extending through an opening in said cover and secured at one end to said plate, said fitting, cover, resilient means, pusher member and plate being held together by said fitting and forming a subassembly.

5. A ball joint comprising a housing having a curved socket portion and a cylindrical portion extending from said socket portion, said socket portion having an opening therein, a stud extending through said opening and having a shank on the outside of said housing and a ball on the inside of said housing, said ball including a first generally hemispherical portion attached to said shank and a second generally hemispherical portion, extending from said first generally hemispherical portion, said first generally hemispherical portion being located in said socket portion and said second generally hemispherical portion being located in said cylindrical portion, a pressure plate engaging said second generally hemispherical portion, a pusher member adjacent said plate, resilient means adjacent said pusher member, closure means compressing said resilient means between said pusher member and said closure means, said compressed resilient means biasing said pusher member against said pressure plate and biasing both said pusher member and said pressure plate toward said second generally hemispherical portion and said opening, said pusher member and said pressure plate being adapted to move toward said opening as said first generally hemispherical portion and said socket portion wear, retaining means in said cylindrical portion located a predetermined distance from said pusher member, said retaining means extending into the path of movement of said pusher member to limit the amount of its movement toward said opening.

6. A ball joint as set forth in claim 5 wherein said retaining means comprises a ring-shaped member having a cylindrical portion and an inwardly and radially extending blocking portion, said cylindrical portion of said ring-shaped member having a press fit within said cylindrical portion of said housing, said generally radially extending portion forming an opening which is larger than the external dimension of said pressure plate, said pusher element having an external dimension which is larger than the internal dimension of said generally radially extending portion and an internal dimension which is smaller than the external dimension of said pressure plate.

* * * * *